United States Patent
Wang et al.

(10) Patent No.: US 10,379,671 B2
(45) Date of Patent: Aug. 13, 2019

(54) TOUCH EVENT PROCESSING METHOD AND APPARATUS, AND TERMINAL DEVICE

(71) Applicant: Huawei Technologies Co., Ltd., Shenzhen, Guangdong (CN)

(72) Inventors: Zaishang Wang, Beijing (CN); Junmin Zhao, Beijing (CN); Xin Zhang, Beijing (CN); Guoquan Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 15/559,401

(22) PCT Filed: Mar. 19, 2015

(86) PCT No.: PCT/CN2015/074585
§ 371 (c)(1),
(2) Date: Sep. 18, 2017

(87) PCT Pub. No.: WO2016/145657
PCT Pub. Date: Sep. 22, 2016

(65) Prior Publication Data
US 2018/0088731 A1    Mar. 29, 2018

(51) Int. Cl.
*G06F 3/041* (2006.01)
*G06F 3/0488* (2013.01)
(Continued)

(52) U.S. Cl.
CPC .......... *G06F 3/0418* (2013.01); *G06F 3/0416* (2013.01); *G06F 3/0488* (2013.01);
(Continued)

(58) Field of Classification Search
CPC .............................................. G06F 3/041–047
See application file for complete search history.

(56) References Cited

U.S. PATENT DOCUMENTS

| 2010/0053094 A1 | 3/2010 | Kong et al. |
| 2011/0096022 A1 | 4/2011 | Wang |

(Continued)

FOREIGN PATENT DOCUMENTS

| CN | 104102437 A | 10/2008 |
| CN | 102053748 A | 5/2011 |

(Continued)

OTHER PUBLICATIONS

L. Engelhardt; "P-36: Native Dual Mode Digitizers: Supporting Pen, Touch and Multi-Touch Inputs in One Device on any LCD"; SID Symposium Digest of Technical Papers; vol. 39; May 2008; 4 pages.

*Primary Examiner* — Hang Lin

(57) ABSTRACT

According to a touch event processing method and apparatus, and a terminal device, if a multi-point touch event that is not processed and that is to be discarded exists, and an application program running in a foreground is a key application program, touch points falling within a target control response area of the application program running in the foreground are determined in touch points of the multi-point touch event. Then, a new touch event is obtained according to the touch points falling within the target control response area, and the new touch event is re-transferred to the application program running in the foreground, so that the application program running in the foreground responds to the new touch event. This resolves a problem that, in some scenarios, a touchscreen does not respond to a touch operation performed by a user.

12 Claims, 5 Drawing Sheets

(51) Int. Cl.
*G06F 9/48* (2006.01)
*G06F 9/451* (2018.01)

(52) U.S. Cl.
CPC ............ *G06F 9/4843* (2013.01); *G06F 9/451* (2018.02); *G06F 2203/04104* (2013.01); *G06F 2203/04808* (2013.01)

(56) References Cited

U.S. PATENT DOCUMENTS

| | | |
|---|---|---|
| 2013/0002602 A1 | 1/2013 | Apelbaum et al. |
| 2013/0111398 A1 | 5/2013 | Lu et al. |
| 2013/0174100 A1 | 7/2013 | Seymour et al. |
| 2013/0246861 A1 | 9/2013 | Colley et al. |
| 2014/0327630 A1 | 11/2014 | Burr et al. |
| 2015/0009162 A1 | 1/2015 | Jung et al. |

FOREIGN PATENT DOCUMENTS

| | | |
|---|---|---|
| CN | 102768607 A | 11/2012 |
| CN | 103218148 A | 7/2013 |
| CN | 103268197 A | 8/2013 |
| CN | 104364750 A | 2/2015 |
| EP | 1942401 A1 | 7/2008 |

TOUCH EVENT PROCESSING METHOD AND APPARATUS, AND TERMINAL DEVICE

CROSS REFERENCE TO RELATED APPLICATIONS

The present application claims priority under 35 U.S.C. § 365 to International Patent Application No. PCT/CN2015/074585 filed Mar. 19, 2015 which is hereby incorporated by reference in its entirety.

TECHNICAL FIELD

The present invention relates to the field of touch event processing technologies, and in particular, to a touch event processing method and apparatus, and a terminal device.

BACKGROUND

An event generated by touching a touchscreen of a terminal by a user is referred to as a touch event, and is also referred to as a touch control event. Generally, an event processor in an Android system directly sends a received touch event to a current interface, that is, a user interface of an application program running in a foreground. The application program processes the touch event by using a corresponding processing method. The application program running in the foreground refers to an application program whose display interface is visible on a screen and that can be used for direct interaction with a user.

The display interface of the application program in the Android system includes an underlying page and a control response area arranged on the underlying page, where a control may be a button or a text area. If a position in which a touch event is performed is in a control response area, an event processor reports the touch event to an application program corresponding to the control response area; or if a position in which a touch event is performed is not in the control response area, the touch event is sent to the underlying page. Generally, the underlying page does not respond to the touch event. Because the underlying page is the last stage for event processing, the touch event to which the underlying page does not respond disappears. If some touch points of a multi-point touch event are not in the control response area of the application program, it is determined that the multi-point touch event is initiated to the underlying page, and the multi-point touch event is reported to the underlying page. For example, if there is a water droplet on a touchscreen, a tap performed by a user on a phone button to answer an incoming call may not be responded to. In the Android system, the water droplet and the taps performed by the user are regarded as a multi-point touch event, and therefore the multi-point touch event is reported to the underlying page. However, the underlying page does not respond to the touch event; consequently, the touch event disappears, that is, the touch operation performed by the user is not responded to.

In some scenarios, when a touchscreen is in an enabled state, even if the touchscreen is not touched by a user, the touchscreen is touched automatically and arbitrarily. It seems that an invisible hand is touching the touchscreen, and this is commonly known as a ghost hand. It can be learned from the foregoing touch event process flow that, when a ghost hand appears on a screen, or a touch event is incorrectly reported because of a factor such as a hand-grip gesture of a user or an external situation (for example, there is a water droplet on the screen), the touch performed by the user on a specified position is not responded to.

SUMMARY

Embodiments of the present invention provide a touch event processing method and apparatus, and a terminal device, so as to resolve a problem in the prior art that no application program responds to a touch operation performed by a user.

To resolve the foregoing technical problem, the embodiments of the present invention disclose the following technical solutions:

According to a first aspect, a touch event processing method is provided, including:

when a multi-point touch event that is not processed and that is to be discarded exists, determining whether an application program running in a foreground is a key application program;

if the application program running in the foreground is a key application program, determining, in touch points in the multi-point touch event, touch points falling within a target control response area of the application program running in the foreground;

obtaining a new touch event according to the touch points falling within the target control response area; and transferring the new touch event obtained by means of combination to the application program running in the foreground, so that the application program running in the foreground responds to the new touch event.

With reference to the first aspect, in a first possible implementation manner of the first aspect, the obtaining a new touch event according to the touch points falling within the target control response area includes:

filtering out an interference touch point from the touch points in the target control response area according to a touch performance parameter, so as to obtain valid touch points; and obtaining the new touch event according to the valid touch points in the target control response area.

With reference to the first possible implementation manner of the first aspect, in a second possible implementation manner of the first aspect, the touch performance parameter includes any one or any combination of: a quantity of taps, a movement distance of a touch point, touch duration, or touch strength.

With reference to the second possible implementation manner of the first aspect, in a third possible implementation manner of the first aspect, the filtering out an interference touch point from the touch points in the target control response area according to a touch performance parameter, so as to obtain valid touch points includes:

if a quantity of taps on the touch points in first preset duration does not exceed a preset quantity, determining that the touch points are valid touch points; and/or if the touch points fall within the target control response area, and a distance between a starting position and an ending position of each of the touch points is less than a length of the target control response area, determining that the touch points are valid touch points; and/or if touch duration of the touch points does not exceed second preset duration, and a distance between a starting position and an ending position of each of the touch points is not less than a preset distance, determining that the touch points are valid touch points; and/or detecting touch strength of the touch points; and if the touch strength is greater than or equal to preset touch strength, determining that the touch points are valid touch points.

With reference to any one of the first aspect, or the first to the third possible implementation manners of the first aspect, in a fourth possible implementation manner of the first aspect, the determining, in touch points in the multi-point touch event, touch points falling within a target control response area of the application program running in the foreground includes:

obtaining position coordinate data corresponding to the target control response area on a current display interface of the application program running in the foreground;

separately determining whether touch position coordinates of the touch points in the multi-point touch event fall within a position coordinate range corresponding to the target control response area on the current display interface; and if the touch position coordinates of the touch points fall within the target control response area on the current display interface, determining that the touch points fall within the target control response area of the application program running in the foreground.

With reference to the fourth possible implementation manner of the first aspect, in a fifth possible implementation manner of the first aspect, the obtaining position coordinate data corresponding to the target control response area on a current display interface of the application program running in the foreground includes:

when the application program running in the foreground is started, obtaining position coordinate data of control response areas on display interfaces of the application program running in the foreground, and storing the position coordinate data of the target control response areas on the display interfaces; and when an update of the application program running in the foreground is detected, updating the stored position coordinate data of the target control response areas on the display interfaces of the application program running in the foreground.

According to a second aspect, a touch event processing apparatus is provided, including:

a first judgment unit, configured to: when a multi-point touch event that is not processed and that is to be discarded exists, determine whether an application program running in a foreground is a key application program;

a determining unit, configured to: if the application program running in the foreground is a key application program, determine, in touch points in the multi-point touch event, touch points falling within a target control response area of the application program running in the foreground;

a combination unit, configured to obtain a new touch event according to the touch points falling within the target control response area of the application program running in the foreground; and a transfer unit, configured to transfer the new touch event obtained by means of combination to the application program running in the foreground, so that the application program running in the foreground responds to the new touch event.

With reference to the second aspect, in a first possible implementation manner of the second aspect, the combination unit includes:

a filtering subunit, configured to filter out an interference touch point from the touch points in the target control response area according to a touch performance parameter, so as to obtain valid touch points; and a combination subunit, configured to obtain the new touch event according to the valid touch points falling within the target control response area.

With reference to the first possible implementation manner of the second aspect, in a second possible implementation manner of the second aspect, the touch performance parameter includes any one or any combination of: a quantity of taps, a movement distance of a touch point, touch duration, or touch strength.

With reference to the second possible implementation manner of the second aspect, in a third possible implementation manner of the second aspect, the filtering subunit is specifically configured to:

if a quantity of taps on the touch points in first preset duration does not exceed a preset quantity, determine that the touch points are valid touch points; and/or if the touch points fall within the target control response area, and a distance between a starting position and an ending position of each of the touch points is less than a length of the target control response area, determine that the touch points are valid touch points; and/or if touch duration of the touch points does not exceed second preset duration, and a distance between a starting position and an ending position of each of the touch points is not less than a preset distance, determine that the touch points are valid touch points; and/or detect touch strength of the touch points; and if the touch strength is greater than or equal to preset touch strength, determine that the touch points are valid touch points.

With reference to any one of the second aspect, or the first to the third possible implementation manners of the second aspect, in a fourth possible implementation manner of the second aspect, the determining unit includes:

an obtaining subunit, configured to obtain position coordinate data corresponding to the target control response area on a current display interface of the application program running in the foreground;

a judgment subunit, configured to separately determine whether touch position coordinates of the touch points in the multi-point touch event fall within a position coordinate range corresponding to the target control response area on the current display interface; and a determining subunit, configured to: if the touch position coordinates of the touch points fall within the target control response area on the current display interface, determine that the touch points fall within the target control response area of the application program running in the foreground.

With reference to the fourth possible implementation manner of the second aspect, in a fifth possible implementation manner of the second aspect, the obtaining subunit is specifically configured to:

when the application program running in the foreground is started, obtain control response areas on display interfaces of the application program running in the foreground, and store position coordinate data of the target control response areas on the display interfaces; and when an update of the application program running in the foreground is detected, update the stored position coordinate data of the target control response areas on the display interfaces of the application program running in the foreground.

According to a third aspect, a terminal device with a touchscreen is provided, including a processor and a memory, where by invoking a program or an instruction that is stored in the memory, the processor is configured to:

when a multi-point touch event that is not processed and that is to be discarded exists, determine whether an application program running in a foreground is a key application program;

if the application program running in the foreground is a key application program, determine, in touch points in the multi-point touch event, touch points falling within a target control response area of the application program running in the foreground;

obtain a new touch event according to the touch points falling within the control response area of the application program running in the foreground; and transfer the new touch event obtained by means of combination to the application program running in the foreground, so that the application program running in the foreground responds to the new touch event.

With reference to the third aspect, in a first possible implementation manner of the third aspect, that the processor is configured to obtain a new touch event according to the touch points in the target control response area of the application program running in the foreground specifically includes:

filtering out an interference touch point from the touch points in the target control response area according to a touch performance parameter, so as to obtain valid touch points; and obtaining the new touch event according to the valid touch points in the target control response area.

With reference to the first possible implementation manner of the third aspect, in a second possible implementation manner of the third aspect, the touch performance parameter includes any one or any combination of: a quantity of taps, a movement distance of a touch point, touch duration, or touch strength.

With reference to the second possible implementation manner of the third aspect, in a third possible implementation manner of the third aspect, that the processor is configured to filter out an interference touch point from the touch points in the target control response area according to a touch performance parameter, so as to obtain valid touch points specifically includes:

if a quantity of taps on the touch points in first preset duration does not exceed a preset quantity, determining that the touch points are valid touch points; and/or if the touch points fall within the target control response area, and a distance between a starting position and an ending position of each of the touch points is less than a length of the target control response area, determining that the touch points are valid touch points; and/or if touch duration of the touch points does not exceed second preset duration, and a distance between a starting position and an ending position of each of the touch points is not less than a preset distance, determining that the touch points are valid touch points; and/or detecting touch strength of the touch points; and if the touch strength is greater than or equal to preset touch strength, determining that the touch points are valid touch points.

With reference to any one of the third aspect, or the first to the third possible implementation manners of the third aspect, in a fourth possible implementation manner of the third aspect, that the processor is configured to determine, in touch points in the multi-point touch event, touch points falling within a target control response area of the application program running in the foreground specifically includes:

obtaining position coordinate data corresponding to the target control response area on a current display interface of the application program running in the foreground;

separately determining whether touch position coordinates of the touch points in the multi-point touch event fall within a position coordinate range corresponding to the target control response area on the current display interface; and if the touch position coordinates of the touch points fall within the target control response area on the current display interface, determining that the touch points fall within the target control response area of the application program running in the foreground.

With reference to the fourth possible implementation manner of the third aspect, in a fifth possible implementation manner of the third aspect, that the processor is configured to obtain position coordinate data corresponding to the target control response area on a current display interface of the application program running in the foreground specifically includes:

when the application program running in the foreground is started, obtaining position coordinate data of control response areas on display interfaces of the application program running in the foreground, and storing the position coordinate data of the target control response areas on the display interfaces; and when an update of the application program running in the foreground is detected, updating the stored position coordinate data of the target control response areas on the display interfaces of the application program running in the foreground. It can be learned from the foregoing technical solutions that, according to the touch event processing method provided in the embodiments of the present invention, when a multi-point touch event that is to be discarded exists, and an application program running in a foreground is a key application program, touch points falling within a control response area are determined in touch points of the multi-point touch event. Then, a new touch event is obtained according to the touch points falling within the control response area of the application program running in the foreground, and the new touch event is transferred to the application program running in the foreground, so that the application program running in the foreground responds to the new touch event. In this method, after being processed according to a touch event processing mechanism, touch points in the multi-point touch event that arrive at the last stage for processing and that are to be discarded are separately analyzed, and separation and recombination are performed on the multi-point touch event according to the control response area of the application program running in the foreground. That is, a touch event generated by touching the control response area of the application program by a user is separated, so as to obtain a new touch event, and the new touch event is re-transferred to the application program running in the foreground, so that the application program running in the foreground responds to the touch event performed by the user. This resolves a problem that, in some scenarios, a touchscreen does not respond to a touch operation performed by a user, thereby improving accuracy of responding to a touch event by an application program.

BRIEF DESCRIPTION OF THE DRAWINGS

Drawings of the specification that constitute a part of the present application are used to provide further understanding of the present invention, and schematic embodiments of the present invention and descriptions thereof are used to explain the present invention, which do not constitute an improper limitation to the present invention. In the drawings.

Figure 1:
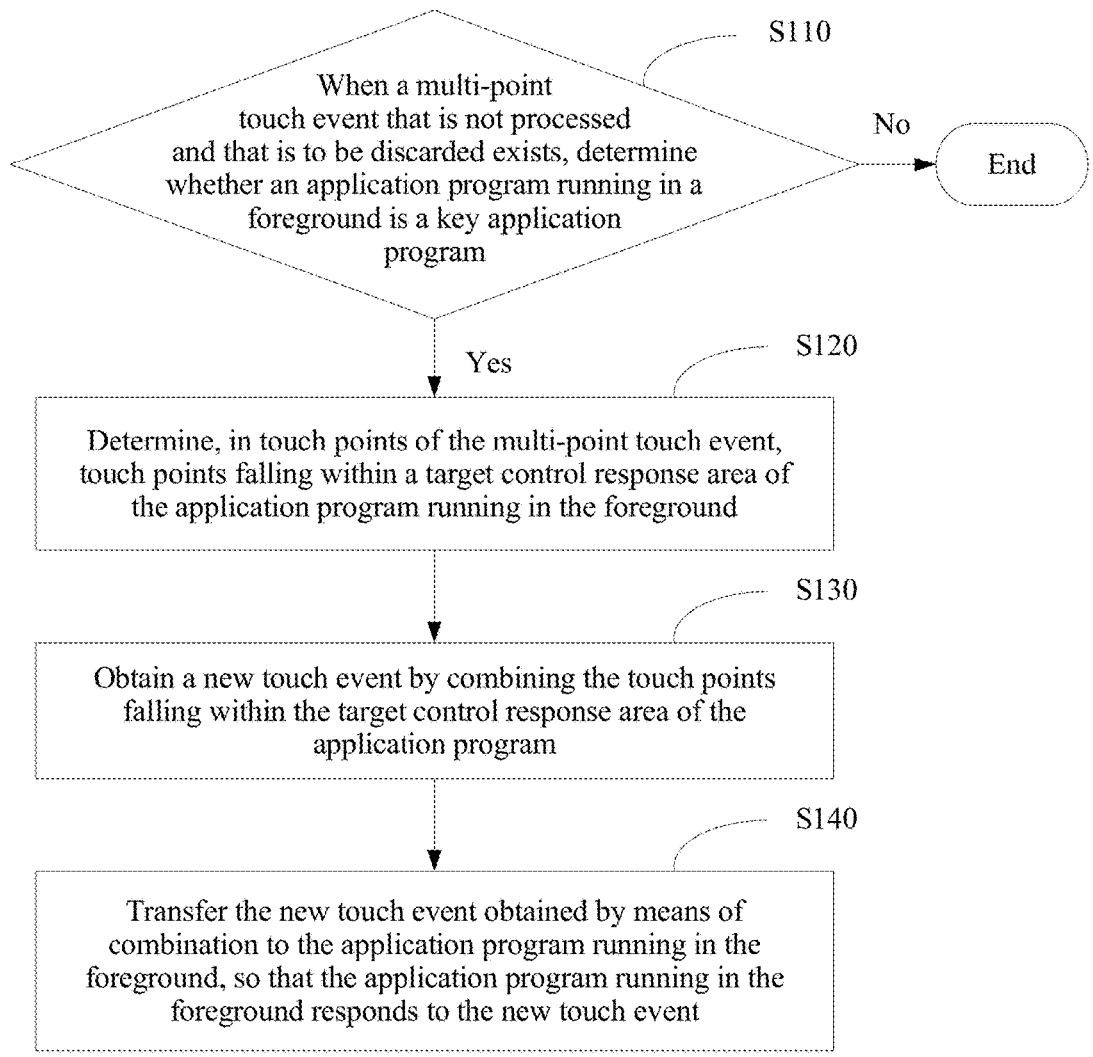
FIG. 1 shows a schematic flowchart of a touch event processing method according to an embodiment of the present invention.

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION

To facilitate understanding of technical solutions in the present invention, a principle of responding to a touch event by an event processor is first introduced.

In an Android system, a view (view) class is a basic building block of a user interface, and is a basic class for constructing a user interface control (for example, a touch button or a text area). One view occupies one area on a screen and is responsible for drawing of a user interface and event processing.

Generally, a touch event is directly reported to a user interface currently displayed on a touchscreen, and a corresponding method is used for processing on the user interface. A user interface may include three classes: a parent view, a child view, and a control. In this application scenario, when a touch event (Touch event) is performed, an event processor first transfers the touch event to a top-level view (a leaf node of a View node tree, that is, a control). If the touch event is not processed by the control, the touch event is then transferred to the child view (an upper-level node of the leaf node). If the touch event is still not processed by the child view, the touch event is then transferred to the parent view (an upper-level node of the child View). If the touch event is still not processed by a bottom-level view (a root node of the View node tree, that is, a View root node), the touch event "disappears", that is, the touch event is discarded. In the foregoing process, if the touch event is processed by any one of the foregoing nodes, the touch event is not transferred to a lower-level view.

To achieve an invention objective of the present invention, the present invention provides a touch event processing method and apparatus, and a terminal device. In this method, touch points in a multi-point touch event that is not processed and that is to be discarded are separately analyzed, and separation and recombination are performed, according to a control response area of a key application program, on the multi-point touch event that is not processed and that is to be discarded. That is, a touch event generated by touching the control response area of the application program by a user is separated, a new touch event is obtained by means of recombination, and the newly obtained touch event is transferred to the application program, so that the application program responds to the touch event performed by the user. The foregoing is the core idea of the present invention. To make a person skilled in the art understand the solutions in the present invention better, the following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Referring to FIG. 1, FIG. 1 shows a schematic flowchart of a touch event processing method according to an embodiment of the present invention. The method is applied to a terminal device with a touchscreen, and may be specifically applied to an event processor in the terminal device. As shown in FIG. 1, the method may include the following steps.

S110: If a multi-point touch event that is not processed and that is to be discarded exists, determine whether an application program running in a foreground is a key application program. If the application program running in the foreground is a key application program, S120 is performed; or if the application program running in the foreground is not a key application program, the current procedure is ended.

According to the foregoing touch event reporting mechanism, if a multi-point touch event transferred to a parent view is not processed, in this case, it is determined that a to-be-discarded multi-point touch event exists. Then, the multi-point touch event is intercepted, and whether an application program running in a foreground is a key application program is determined. If the application program running in the foreground is a key application program, S120 is performed.

A key application program may be an application program set by a system, for example, an application program like a phone application program or a short messaging application program; alternatively, some application programs may be preset by a user as key application programs. The system determines, according to a package name of the application program, whether the application program running in the foreground is a key application program. The package name of the application program is a unique identifier of the application program. If package names of the key application programs include the package name of the application program running in the foreground, it is determined that the application program running in the foreground is a key application program. S120: Determine, in touch points of the multi-point touch event, touch points falling within a target control response area of the application program running in the foreground.

First, all controls that are on a current display interface of the application program running in the foreground and that can respond to a touch event are obtained, and all controls on the current display interface are used as a set. Then, a target control is determined from the control set, and a target control response area corresponding to the target control is determined.

A target control response area may be determined by the system according to control areas included in a display interface of a key application program. For example, for a phone application program, if the current display interface is a page for making a call, it is determined that a control response area corresponding to a control used for answering the call is a target control response area; or if the current display interface is a page for answering a call, it is determined that a control response area corresponding to a control used for hanging up is a target control response area.

The touch points in the multi-point touch event are separately analyzed to determine whether the touch points fall within the target control response area.

S130: Obtain a new touch event according to the touch points falling within the target control response area of the application program.

A new touch event is obtained by combining the touch points falling within the target control response area. For example, the current display interface includes three control response areas: an area I and an area II. The area I is the target control response area. If separated touch points falling within the control response area includes two points, A and B, and the point A falls within the area I, the point A is used as a new touch event.

S140: Transfer the new touch event obtained by means of combination to the application program running in the foreground, so that the application program running in the foreground responds to the new touch event.

The new touch event obtained by means of combination is re-transferred to the application program running in the foreground, and the application program responds to the new touch event, thereby avoiding a problem that, in a scenario, a tap performed on the control response area of the application program running in the foreground by a user is not responded to.

According to the touch event processing method provided in this embodiment, if a multi-point touch event that is not processed and that is to be discarded exists, and an application program running in a foreground is a key application program, touch points falling within a control response area of the application program running in the foreground are determined in touch points of the multi-point touch event. Then, a new touch event is obtained by combining the touch points falling within the target control response area of the application program running in the foreground, and the new touch event is re-transferred to the application program running in the foreground, so that the application program running in the foreground responds to the new touch event, that is, the application program responds to the touch event performed by a user, thereby avoiding a problem that, in some scenarios, a touch operation performed by a user is not responded to.

In some scenarios, a ghost hand appears exactly in the control response area of the application program running in the foreground, and therefore, interference touch points need to be filtered out, and finally left touch points are touch points to which the application program needs to respond.

Figure 2:
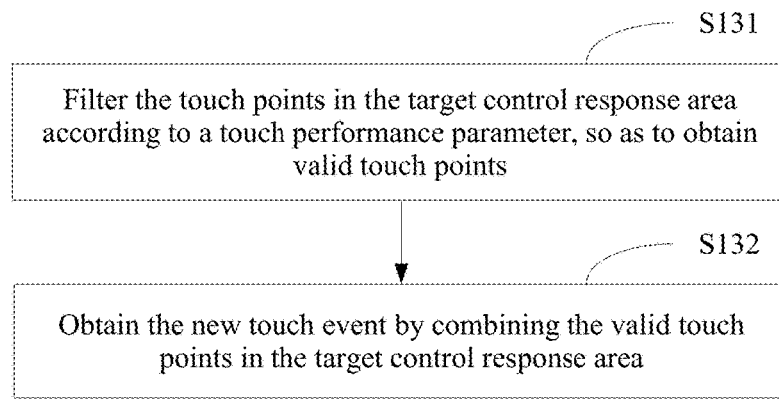
FIG. 2 shows a schematic flowchart of S130 in the method according to an embodiment of the present invention.

Referring to FIG. 2, FIG. 2 shows a schematic flowchart of S130 in the method according to an embodiment of the present invention. As shown in FIG. 2, S130 may include the following steps.

S131: Filter the touch points in the target control response area according to a touch performance parameter, so as to obtain valid touch points.

In this embodiment of the present invention, the touch performance parameter may include any one or any combination of: a quantity of taps, a movement distance of a touch point, touch duration, or touch strength.

In an application scenario, touch position coordinates of a touch point fall within a target control response area of an application program running in a foreground; however, the touch point has a movement distance, and a distance between a starting position and an ending position of the touch point is greater than length of the control response area. In this case, it is determined that the touch point is an invalid touch point, and the touch point is discarded. If the touch position of the touch point falls within the target control response area, and the distance between the starting position and the ending position of the touch point is less than the length of the control response area, it is determined that the touch point is a valid touch point.

In another scenario, a ghost hand appears in a target control response area, and the target control response area is tapped for hundreds of times in preset duration. In this scenario, ghost hand interference points may be filtered out by collecting a quantity of taps on a touch point in a period. If a quantity of taps on the touch point in first preset duration exceeds a preset quantity, it is determined that the touch point is an invalid touch point, and the touch point is discarded; or if the quantity of taps on the touch point in the first preset duration does not exceed a preset quantity, the touch point is a valid touch point.

In still another scenario, touch duration of a ghost hand is relatively long and a movement distance is relatively short. In this scenario, touch duration and a movement distance of a touch point are detected. If the touch duration of the touch point does not exceed second preset duration, and the movement distance of the touch point is not less than a preset distance, it is determined that the touch point is a valid touch point; or if the touch duration of the touch point exceeds the second preset duration, and the movement distance of the touch point is less than the preset distance, it is determined that the touch point is an invalid touch point, and the touch point is discarded.

As a screen of a mobile terminal becomes larger and a border of the screen becomes narrower, an edge of the screen may be easily touched by a finger of a user, which may affect a response to a touch event performed by the user. In this scenario, an interference touch point may be eliminated according to touch strength. First, touch strength of a touch point is detected. If the touch strength is greater than or equal to preset touch strength, it is determined that the touch point is a valid touch point; or if the touch strength is less than the preset touch strength, it is determined that the touch point is an invalid touch point.

Certainly, in addition to the foregoing four scenarios, an interference touch point may be eliminated by using any combination of the touch performance parameters.

S132: Obtain the new touch event by combining the valid touch points in the target control response area.

A new touch event is obtained by combining touch points in a target control response area. The newly obtained touch event may be a single-point touch event; or may be a multi-point touch event, for example, when a user touches a control response area on a current display interface by using two fingers.

According to the method provided in this embodiment for obtaining a new touch event by means of combination, touch points separated from a to-be-discarded multi-point touch event are filtered, so that an interference touch point is filtered out, and touch points to which an application program needs to respond are left, that is, valid touch points. Then, a new touch event is obtained by combining the valid touch points falling within a target control response area.

Interference touch points in the new touch event are greatly reduced by using this method, and the touch event is accurately responded to.

Figure 3:
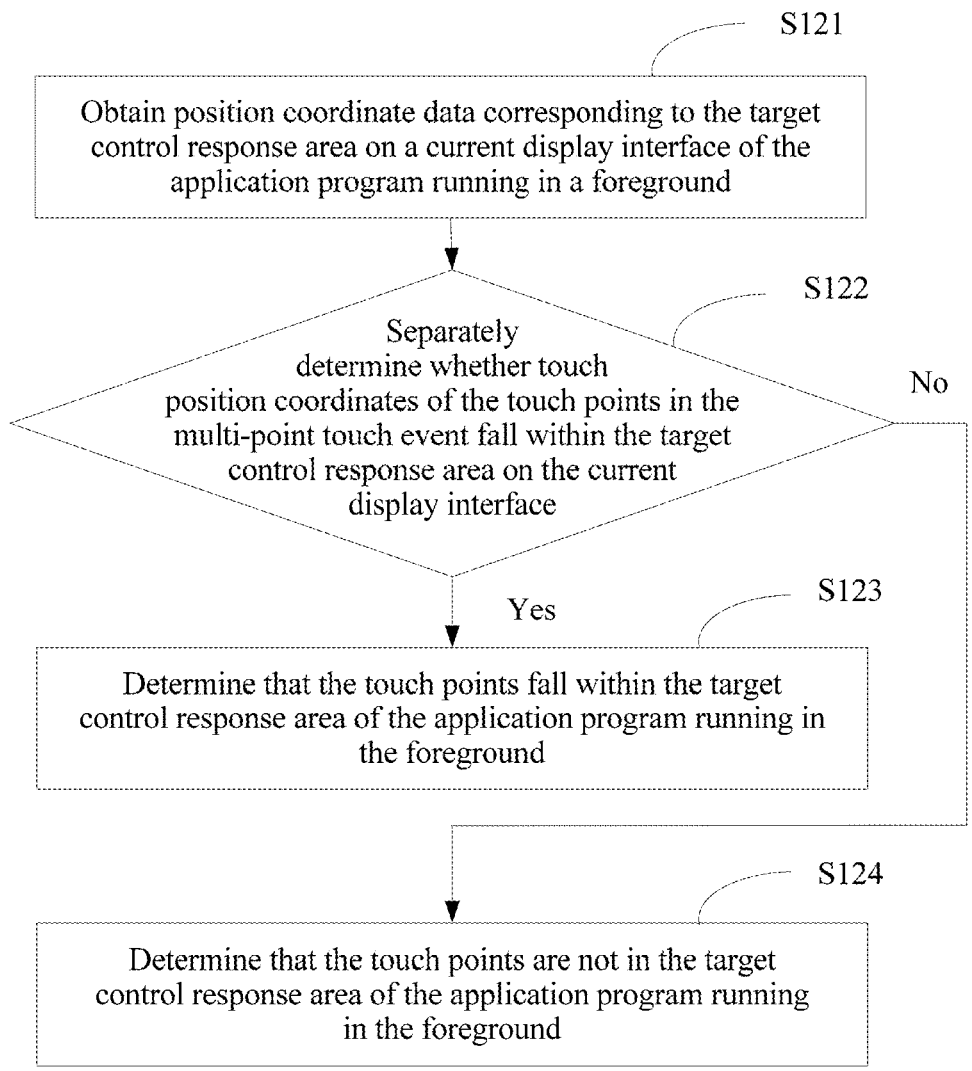
FIG. 3 shows a schematic flowchart of S120 in the method according to an embodiment of the present invention.

Referring to FIG. 3, FIG. 3 shows a schematic flowchart of S120 in the method according to an embodiment of the present invention. As shown in FIG. 3, S120 may include the following steps.

S121: Obtain position coordinate data corresponding to the target control response area on a current display interface of the application program running in a foreground.

In an embodiment of the present invention, position coordinate data of a target control response area on a display interface of an application program running in the foreground can be obtained when positions of touch points in a multi-point touch event need to be determined.

In another embodiment of the present invention, when a key application program is started, position coordinate data of a control response area of the application program is dynamically obtained, and position coordinate data of the target control response area is stored, so that the position coordinate data of the target control response area is directly read in subsequent use.

A control response area of an application program may change with an update of the application program, and therefore, after an update of the application program installed on a terminal device is detected, the stored position coordinate data of the control response areas on the display interfaces of the application program is updated, so as to ensure that the stored position coordinate data of the control response areas is always corresponding to the installed application program. In this manner, position coordinate data of a control response area of a key application program only needs to be obtained once, and is directly read in subsequent use instead of being obtained each time, thereby reducing occupied CPU resources.

S122: Separately determine whether touch position coordinates of the touch points in the multi-point touch event fall within the target control response area on the current display interface. If the touch position coordinates of the touch points in the multi-point touch event fall within the target control response area on the current display interface, S123 is performed; or if touch position coordinates of the touch points in the multi-point touch event are not in the target control response area on the current display interface, S124 is performed.

S123: Determine that the touch points fall within the target control response area of the application program running in the foreground.

S124: Determine that the touch points are not in the target control response area of the application program running in the foreground, and then discard the touch points.

According to the method provided in this embodiment for determining touch points falling within a control response area, position coordinate data of a target control response area on a display interface of an application program is obtained, touch points in a multi-point touch event are separately analyzed to determine whether the touch points fall within the target control response area, so as to detect touch points whose touch coordinates are in the control response area. When the control response area is obtained, position coordinate data of the control response area can be obtained when a key application program is started, and position coordinate data of the target control response area is stored, so that the position coordinate data of the target control response area is directly read in subsequent use instead of being obtained each time, thereby reducing occupied CPU resources.

Corresponding to the foregoing embodiments of a touch event processing method, the present invention further provides embodiments of a touch event processing apparatus.

Figure 4:
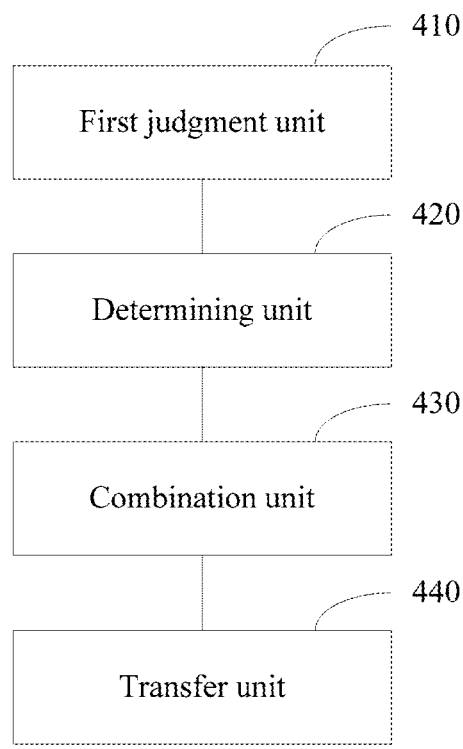
FIG. 4 shows a block diagram of a touch event processing apparatus according to an embodiment of the present invention.

Referring to FIG. 4, FIG. 4 shows a block diagram of a touch event processing apparatus according to an embodiment of the present invention. The apparatus is applied to a terminal device with a touchscreen. As shown in FIG. 4, the apparatus includes a first judgment unit 410, a determining unit 420, a combination unit 430, and a transfer unit 440.

The first judgment unit 410 is configured to: when a multi-point touch event that is not processed and that is to be discarded exists, determine whether an application program running in a foreground is a key application program.

According to the touch event reporting mechanism, if a multi-point touch event that is not processed and that is to be discarded exists, the multi-point touch event is intercepted, and whether an application program running in a foreground is a key application program is determined.

The determining unit 420 is configured to: if the application program running in the foreground is a key application program, determine, in touch points in the multi-point touch event, touch points falling within a target control response area of the application program running in the foreground.

The combination unit 430 is configured to obtain a new touch event by combining the touch points falling within the target control response area.

The transfer unit 440 is configured to transfer the new touch event obtained by means of combination to the application program running in the foreground, so that the application program running in the foreground responds to the new touch event.

According to the touch event processing apparatus provided in this embodiment, if a multi-point touch event that is not processed and that is to be discarded still exists in the last stage for touch event processing, a judgment unit determines whether an application program running in a foreground is a key application program. If the application program running in the foreground is a key application program, a determining unit determines, in touch points in the multi-point touch event, touch points falling within a target control response area of the application program running in the foreground. Then, a combination unit obtains a new touch event according to the touch points falling within the target control response area, and re-transfers the new touch event to the application program running in the foreground, so that the application program running in the foreground responds to the new touch event. In this way, the application program running in the foreground responds to a touch event performed by a user, thereby avoiding a problem that, in some scenarios, a touchscreen does not respond to a touch operation performed by a user.

Figure 5:
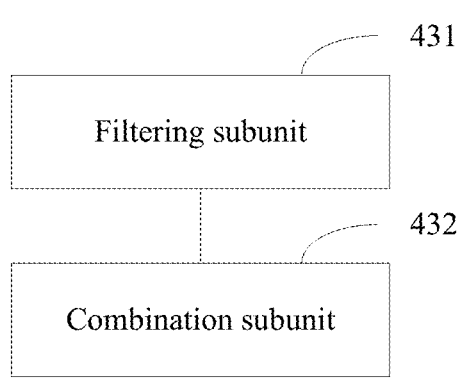
FIG. 5 shows a block diagram of a combination unit according to an embodiment of the present invention.

In an embodiment of the present invention, for a purpose of separating a new touch event with a relatively high accuracy, where the new touch event is constituted by touch points that are in all current touch points and to which an application program needs to respond to, a combination unit 420 further needs to filter out an invalid touch point from touch points falling within a target control response area, so as to obtain valid touch points. As shown in FIG. 5, the combination unit 430 may include a filtering subunit 431 and a combination subunit 432.

The filtering subunit 431 is configured to filter out an interference touch point from the touch points in the target control response area according to a touch performance parameter, so as to obtain valid touch points.

The touch performance parameter includes any one or any combination of: a quantity of taps, a movement distance of a touch point, touch duration, or touch strength.

In an application scenario, touch position coordinates of a touch point fall within a control response area of an application program; however, the touch point has a movement distance, and a distance between a starting position and an ending position of the touch point is greater than length of the control response area. In this case, the filtering subunit 431 determines that the touch point is an invalid touch point, and the touch point is discarded. If the touch position of the touch point falls within the control response area, and the distance between the starting position and the ending position of the touch point is less than the length of the control response area, the filtering subunit 431 determines that the touch point is a valid touch point.

In another scenario, a ghost hand appears in a control response area, and the control response area is tapped for hundreds of times in preset duration. In this scenario, ghost hand touch points may be filtered out by collecting a quantity of taps on a touch point in a period. If a quantity of taps on the touch point in first preset duration exceeds a preset quantity, the filtering subunit 431 determines that the touch point is an invalid touch point, and the touch point is discarded; or if the quantity of taps on the touch point in the first preset duration does not exceed a preset quantity, the touch point is a valid touch point.

In still another scenario, touch duration of a ghost hand is relatively long and a movement distance is relatively short. In this scenario, touch duration and a movement distance of a touch point are detected. If the touch duration of the touch point does not exceed second preset duration, and the movement distance of the touch point is not less than a preset distance, the filtering subunit 431 determines that the touch point is a valid touch point; or if the touch duration of the touch point exceeds the second preset duration, and the movement distance of the touch point is less than the preset distance, the filtering subunit 431 determines that the touch point is an invalid touch point, and the touch point is discarded.

As a screen of a mobile terminal becomes larger and a border of the screen becomes narrower, an edge of the screen may be easily touched by a finger of a user, which may affect a response to a touch event performed by the user. In this scenario, an interference touch point may be eliminated according to touch strength. First, touch strength of a touch point is detected. If the touch strength is greater than or equal to preset touch strength, it is determined that the touch point is a valid touch point; or if the touch strength is less than the preset touch strength, it is determined that the touch point is an invalid touch point.

Certainly, in addition to the foregoing four scenarios, an interference touch point may be eliminated by using any combination of the touch performance parameters.

The combination subunit 432 is configured to obtain the new touch event according to the valid touch points falling within the target control response area.

According to the combination unit provided in this embodiment, touch points separated from a multi-point touch event that is not processed are filtered, so that an interference touch point is filtered out, and touch points to which an application program running in a foreground needs to respond are obtained, that is, valid touch points. Then, a new touch event is obtained by combining the valid touch points falling within a target control response area of the application program running in the foreground. Interference touch points in the new touch event are greatly reduced by using this method, and the touch event is accurately responded to.

Figure 6:
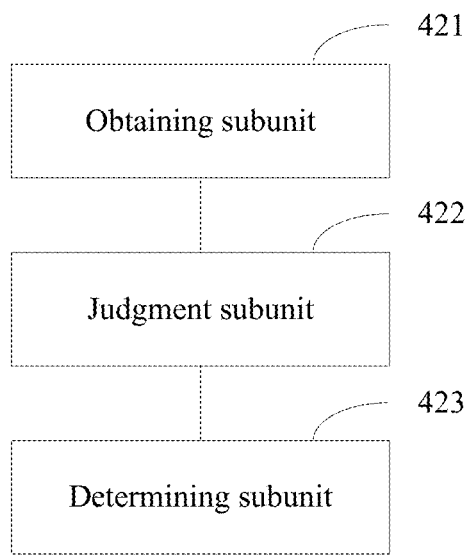
FIG. 6 shows a block diagram of a determining unit according to an embodiment of the present invention.

Referring to FIG. 6, FIG. 6 shows a block diagram of a determining unit according to an embodiment of the present invention. The determining unit 420 includes an obtaining subunit 421, a judgment subunit 422, and a determining subunit 423.

The obtaining subunit 421 is configured to obtain position coordinate data corresponding to the target control response area on a current display interface of the application program running in a foreground.

A current display interface of an application program refers to a display interface that is of the application program and that is currently displayed by a terminal device with a touchscreen, that is, the current display interface of the application program. Control response areas corresponding to all controls on the current display interface of the application program are obtained, and a control response area corresponding to a target control is determined as a target response area.

In an embodiment of the present invention, position coordinate data of a target control response area on a display interface of an application program running in the foreground can be obtained when positions of touch points in a multi-point touch event need to be determined.

In another embodiment of the present invention, when a key application program is started, position coordinate data of a control response area of the application program is dynamically obtained, and position coordinate data of target control response areas on display interfaces of the application program is stored, so that the position coordinate data of the target control response areas is directly read in subsequent use.

A control response area of an application program may change with an update of the application program, and therefore, after an update of the application program installed on a terminal device is detected, the stored position coordinate data of the control response areas on the display interfaces of the application program is updated, so as to ensure that the stored position coordinate data of the control response areas is always corresponding to the installed application program.

The judgment subunit 422 is configured to separately determine whether touch position coordinates of the touch points in the multi-point touch event fall within the target control response area on the current display interface.

The determining subunit 423 is configured to: if the touch position coordinates of the touch points fall within the target control response area on the current display interface, determine that the touch points fall within the target control response area of the application program running in the foreground.

According to the determining unit provided in this embodiment, position coordinate data of a target control response area on a current display interface of an application program running in a foreground is obtained by an obtaining subunit, touch points of a multi-point touch event are separately determined to determine whether the touch points fall within the target control response area, so as to detect touch points whose touch coordinates are in the target control response area. When the control response area is obtained, position coordinate data of the control response area can be obtained when a key application program is started, and position coordinate data of the target control response area is stored, so that the position coordinate data of the control response area is directly read in subsequent use instead of being obtained each time, thereby reducing occupied CPU resources.

Corresponding to the foregoing embodiments of a touch event processing method, the present invention further provides an embodiment of a terminal device in which the touch event processing method is applied.

Figure 7:
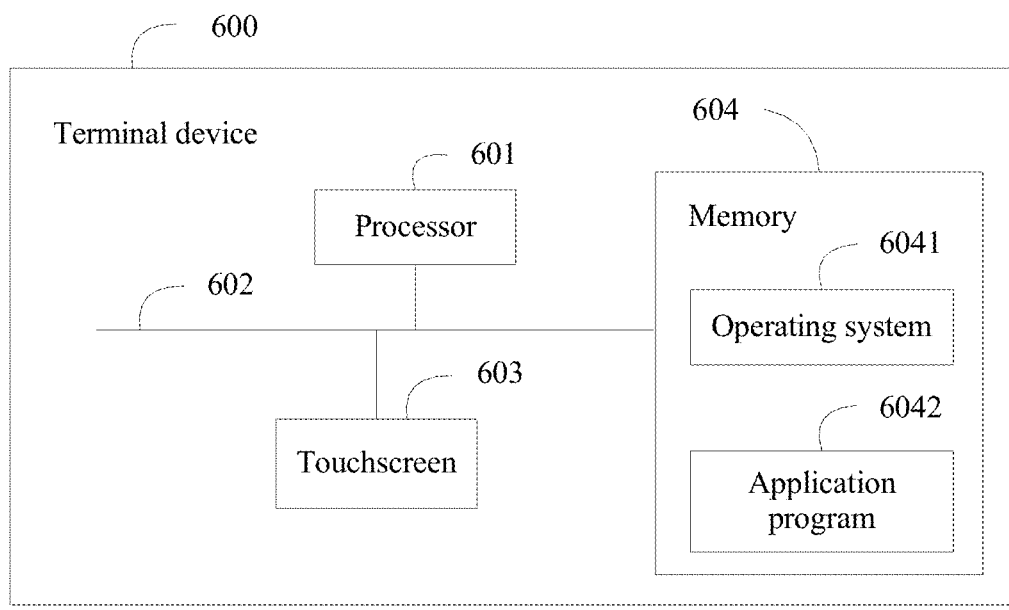
FIG. 7 shows a structural block diagram of a terminal device according to an embodiment of the present invention.

Referring to FIG. 7, FIG. 7 shows a structural block diagram of a terminal device according to an embodiment of the present invention. The terminal device 600 includes at least one processor 601, at least one communications bus 602, a touchscreen 603, and a memory 604604. The communications bus 602 is configured to implement connection and communication between the components. The touchscreen 603 is configured to implement the foregoing touch event processing method.

The touchscreen 603 may include a capacitive touchscreen or a resistive touchscreen.

The memory 604604 may include a read-only memory and a random access memory, and provides an instruction and data to the processor 601. A part of the memory 604 may further include a nonvolatile random access memory (NVRAM).

In some implementation manners, the memory 604 stores the following elements: an executable module or a data structure, a subset of an executable module and a data structure, or an extended set of an executable module and a data structure. In this embodiment, the memory 604 includes an operating system 6041 and an application program module 6042.

The operating system 6041 includes various system programs that are used to implement various basic services and process hardware-based tasks.

The application program module 6042 includes various application programs, such as a launcher (launcher), a media player (Media Player), and a browser (Browser) that are configured to implement various application services.

In this embodiment of the present invention, by invoking the program or the instruction stored in the memory 604, the processor 601 is configured to:

when a multi-point touch event that is not processed and that is to be discarded exists, determine whether an application program running in a foreground is a key application program;

if the application program running in the foreground is a key application program, determine, in touch points in the multi-point touch event, touch points falling within a target control response area of the application program running in the foreground;

obtain a new touch event according to the touch points falling within the target control response area of the application program running in the foreground; and transfer the new touch event obtained by means of combination to the application program running in the foreground, so that the application program running in the foreground responds to the new touch event.

Optionally, in an embodiment, that the processor 601 is configured to obtain a new touch event by combining the touch points in the target control response area of the application program running in the foreground specifically includes:

filtering out an interference touch point from the touch points in the target control response area according to a touch performance parameter, so as to obtain valid touch points; and obtaining the new touch event by combining the valid touch points in the target control response area.

Further, the touch performance parameter includes any one or any combination of: a quantity of taps, a movement distance of a touch point, touch duration, or touch strength.

That the processor 601 is configured to filter out an interference touch point from the touch points in the target control response area, so as to obtain valid touch points specifically includes:

if a quantity of taps on the touch points in first preset duration does not exceed a preset quantity, determining that the touch points are valid touch points; and/or if the touch points fall within the target control response area, and a distance between a starting position and an ending position of each of the touch points is less than a length of the target control response area, determining that the touch points are valid touch points; and/or if touch duration of the touch points does not exceed second preset duration, and a distance between a starting position and an ending position of each of the touch points is not less than a preset distance, determining that the touch points are valid touch points; and/or detecting touch strength of the touch points; and if the touch strength is greater than or equal to preset touch strength, determining that the touch points are valid touch points.

Optionally, in an embodiment of the present invention, that the processor 601 is configured to determine, in touch points in the multi-point touch event, touch points falling within a target control response area of the application program running in the foreground specifically includes:

obtaining position coordinate data corresponding to the target control response area on a current display interface of the application program running in a foreground;

separately determining whether touch position coordinates of the touch points in the multi-point touch event fall within a position coordinate range of the target control response area on the current display interface; and if the touch position coordinates of the touch points fall within the target control response area on the current display interface, determining that the touch points fall within the target control response area of the application program running in the foreground.

Optionally, in an embodiment of the present invention, that the processor 601 is configured to obtain position coordinate data corresponding to the target control response area on a current display interface of the application program specifically includes:

when the application program running in the foreground is started, obtaining position coordinate data of control response areas on display interfaces of the application program running in the foreground, and storing the position coordinate data of the target control response areas on the display interfaces; and when an update of the application program running in the foreground is detected, updating the stored position coordinate data of the target control response areas on the display interfaces of the application program running in the foreground.

It can be learned that, after the foregoing solution is used, if a multi-point touch event that is not processed still exists in the last stage for touch event processing, and an application program running in a foreground is a key application program, touch points falling within a target control response area of the application program running in the foreground are determined in touch points of the multi-point touch event. Then, a new touch event is obtained by combining the touch points falling within the target control response area, and the new touch event is re-transferred to the application program running in the foreground, so that the application program running in the foreground responds to the new touch event, that is, the application program running in the foreground responds to a touch event performed by a user. This resolves a problem that, in some scenarios, a touchscreen does not respond to a touch operation performed by a user.

The embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly; for related parts, reference may be made to partial descriptions in the method embodiment. The described apparatus and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The present invention can be described in the general context of executable computer instructions executed by a computer, for example, a program module. Generally, the program unit includes a routine, program, object, component, data structure, and the like for executing a particular task or implementing a particular abstract data type. The present invention may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

The foregoing descriptions are merely specific implementation manners of the present invention. It should be noted that a person of ordinary skill in the art may make several improvements or polishing without departing from the principle of the present invention and the improvements or polishing shall fall within the protection scope of the present invention.

What is claimed is:

1. A touch event processing method, comprising:
   when an unprocessed multi-point touch event that is to be discarded exists, determining whether an application program running in a foreground is a key application program;
   if the application program running in the foreground is a key application program, determining, from touch points in the multi-point touch event, touch points falling within a target control response area of the application program running in the foreground;
   obtaining a new touch event according to the touch points falling within the target control response area; and
   transferring the new touch event obtained by means of combination to the application program running in the foreground, so that the application program running in the foreground responds to the new touch event.

2. The method according to claim 1, wherein obtaining a new touch event according to the touch points falling within the target control response area comprises:
   filtering out an interference touch point from the touch points falling within the target control response area according to a touch performance parameter to obtain valid touch points; and
   obtaining the new touch event according to the valid touch points in the target control response area.

3. The method according to claim 2, wherein the touch performance parameter comprises at least one of: a quantity of taps, a movement distance of a touch point, touch duration, or touch strength.

4. The method according to claim 3, wherein filtering out an interference touch point from the touch points in the target control response area according to a touch performance parameter to obtain valid touch points comprises:
   if a quantity of taps on the touch points in first preset duration does not exceed a preset quantity, determining the touch points are valid touch points; and/or
   if the touch points fall within the target control response area, and a distance between a starting position and an ending position of each of the touch points is less than a length of the target control response area, determining that the touch points are valid touch points; and/or
   if touch duration of the touch points does not exceed second preset duration, and a distance between a starting position and an ending position of each of the touch points is not less than a preset distance, determining that the touch points are valid touch points; and/or
   detecting touch strength of the touch points; and if the touch strength is greater than or equal to preset touch strength, determining that the touch points are valid touch points.

5. The method according to claim 1, wherein determining, from touch points in the multi-point touch event, touch points falling within a target control response area of the application program running in the foreground comprises:
   obtaining position coordinate data corresponding to the target control response area on a current display interface of the application program running in the foreground;
   separately determining whether touch position coordinates of the touch points in the multi-point touch event fall within a position coordinate range corresponding to the target control response area on the current display interface; and
   if the touch position coordinates of the touch points fall within the target control response area on the current display interface, determining the touch points fall within the target control response area of the application program running in the foreground.

6. The method according to claim 5, wherein obtaining position coordinate data corresponding to the target control response area on a current display interface of the application program running in the foreground comprises:
   when the application program running in the foreground is started, obtaining position coordinate data of control response areas on display interfaces of the application program running in the foreground, and storing the position coordinate data of the target control response areas on the display interfaces; and when an update of the application program running in the foreground is detected, updating the stored position coordinate data of the target control response areas on the display interfaces of the application program running in the foreground.

7. A terminal device, comprising:
a touchscreen;
a processor; and
a memory storing instructions which, when executed by the processor, cause the processor to:
when an unprocessed multi-point touch event that is to be discarded exists, determine whether an application program running in a foreground is a key application program,
if the application program running in the foreground is a key application program, determine, from touch points in the multi-point touch event, touch points falling within a target control response area of the application program running in the foreground,
obtain a new touch event according to the touch points falling within the control response area of the application program running in the foreground, and
transfer the new touch event obtained by means of combination to the application program running in the foreground, so that the application program running in the foreground responds to the new touch event.

8. The terminal device according to claim 7, wherein to obtain a new touch event according to the touch points in the target control response area of the application program running in the foreground, the instructions when executed by the processor, further cause the processor to:
filter out an interference touch point from the touch points in the target control response area according to a touch performance parameter to obtain valid touch points; and
obtain the new touch event according to the valid touch points in the target control response area.

9. The terminal device according to claim 8, wherein the touch performance parameter comprises at least one of: a quantity of taps, a movement distance of a touch point, touch duration, or touch strength.

10. The terminal device according to claim 8, wherein to filter out an interference touch point from the touch points in the target control response area according to a touch performance parameter to obtain valid touch points, the instructions when executed by the processor, further cause the processor to:

if a quantity of taps on the touch points in first preset duration does not exceed a preset quantity, determining that the touch points are valid touch points; and/or
if the touch points fall within the target control response area, and a distance between a starting position and an ending position of each of the touch points is less than a length of the target control response area, determining that the touch points are valid touch points; and/or
if touch duration of the touch points does not exceed second preset duration, and a distance between a starting position and an ending position of each of the touch points is not less than a preset distance, determining that the touch points are valid touch points; and/or
detecting touch strength of the touch points; and if the touch strength is greater than or equal to preset touch strength, determining that the touch points are valid touch points.

11. The terminal device according to claim 7, wherein to determine, in touch points in the multi-point touch event, touch points falling within a target control response area of the application program running in the foreground, the instructions when executed by the processor, further cause the processor to:
obtain position coordinate data corresponding to the target control response area on a current display interface of the application program running in the foreground;
separately determine whether touch position coordinates of the touch points in the multi-point touch event fall within a position coordinate range corresponding to the target control response area on the current display interface; and
if the touch position coordinates of the touch points fall within the target control response area on the current display interface, determine that the touch points fall within the target control response area of the application program running in the foreground.

12. The terminal device according to claim 11, wherein to obtain position coordinate data corresponding to the target control response area on a current display interface of the application program running in the foreground, the instructions when executed by the processor, further cause the processor to:
when the application program running in the foreground is started, obtain position coordinate data of control response areas on display interfaces of the application program running in the foreground, and store the position coordinate data of the target control response areas on the display interfaces; and
when an update of the application program running in the foreground is detected, update the stored position coordinate data of the target control response areas on the display interfaces of the application program running in the foreground.

* * * * *